United States Patent [19]
Donovan

[11] Patent Number: 5,884,569
[45] Date of Patent: *Mar. 23, 1999

[54] METHOD AND APPARATUS FOR CONTAINING AND SUPPRESSING EXPLOSIVE DETONATIONS

[76] Inventor: John L. Donovan, P.O. Box 486, Danvers, Ill. 61732

[*] Notice: The term of this patent shall not extend beyond the expiration date of Pat. No. 5,613,453.

[21] Appl. No.: 823,223

[22] Filed: Mar. 24, 1997

Related U.S. Application Data

[63] Continuation-in-part of Ser. No. 578,200, Dec. 29, 1995, Pat. No. 5,613,453.

[51] Int. Cl.$^6$ ........................................................ F23G 7/00
[52] U.S. Cl. .............................. 110/346; 110/237; 72/56; 588/202
[58] Field of Search ................................. 86/50; 110/237, 110/346; 72/56; 29/421.2; 588/202

[56] References Cited

U.S. PATENT DOCUMENTS

| | | | |
|---|---|---|---|
| 3,793,101 | 2/1974 | Mullarkey | 86/50 |
| 3,903,814 | 9/1975 | Altekruse | 110/237 |
| 4,174,624 | 11/1979 | Shrum | 72/56 |
| 5,044,252 | 9/1991 | Gamadi et al. | 86/50 |
| 5,495,812 | 3/1996 | Schulze | 110/238 |
| 5,668,342 | 9/1997 | Discher | 86/50 |

OTHER PUBLICATIONS

Joe Serena, "Blast containment structure passes proof test-"*Ordnance Explosives Environment*, Apr.–Jun. 1996.
Joseph M. Serena, "Development of an On–Site Demolition Container for Unexploded Ordnance"presented at the Global Demilitarization Symposium and Exposition, 13–17 May 1996.

*Primary Examiner*—Henry A. Bennett
*Assistant Examiner*—Susanne C. Tinker
*Attorney, Agent, or Firm*—Bullwinkel Partners, Ltd.

[57] ABSTRACT

A method and apparatus for enclosing, controlling and suppressing the explosive destruction of munitions, including cluster-bomb munitions by detonation in an explosion chamber. The apparatus comprises a double-walled steel explosion chamber in which the of the chamber walls and access doors are filled with granular shock damping silica sand. The floor of the chamber is covered with granular shock-damping pea gravel. An array of vent pipes vents the chamber into manifolds leading to a scrubber for further cooling and environmental treatment of the gaseous combustion products. Within the chamber, plastic bags of water are suspended over the detonation. A munition to be destroyed is placed within an open-topped manganese steel fragmentation containment unit, which is then placed within the chamber under a woven steel blast mat secured to the chamber roof. The method of operation for destroying munitions, particularly cluster-bomb munitions, comprises the steps of removing the end closures of the munition, expelling the clustered array of bomblets into a plastic carrier tube, positioning the carrier tube full of bomblets within a separate open-topped steel fragmentation containment unit, placing the fragmentation containment unit within the chamber on the granular bed, suspending plastic bags containing an amount of water chosen according to the type and amount of explosive in the munition, attaching a starter charge and ignition wires to the carrier tube and bomblets, closing the access and vent doors, electrically detonating the explosive, and exhausting the combustion products of the detonation from the chamber through a scrubber.

20 Claims, 5 Drawing Sheets

METHOD AND APPARATUS FOR CONTAINING AND SUPPRESSING EXPLOSIVE DETONATIONS

This application is a continuation-in-part of my application Ser. No. 08/578,200 filed Dec. 29, 1995, and issued Mar. 25, 1997 as U.S. Pat. No. 5,613,453.

FIELD OF THE INVENTION

This invention relates to a method and apparatus for containing, controlling and suppressing the detonation of explosives, particularly for the explosion working of metals, and for the disposal of unwanted explosive munitions and toxic materials.

BACKGROUND OF THE INVENTION

Explosives have many useful industrial applications including surface hardening of austenitic manganese alloy steels, surface deposition coating, welding of metallic components, compression molding of components from powders and granular media, and disposal of unwanted explosive or toxic materials.

The prior art reflects many attempts to contain the explosion process for the suppression of noise, shock and noxious polluting explosion products.

Hampel U.S. Pat. No. 5,419,862 discloses a large explosion chamber in which an explosive work piece is introduced in through an air lock into a vacuum chamber where it is detonated, and after detonation the explosion products are allowed to escape into the atmosphere. The chamber is mechanically secured by anchor rods to a foundation.

Gambarov, et al. U.S. Pat. No. 4,100,783 discloses a cylindrical containment vessel, split along its diameter for separation, and openable for the insertion of large work pieces such as railway frogs, stone crusher wear parts and the like. After insertion of a work piece and explosive charge, the chamber is closed and locked and the explosive detonated by a built-in detonating device. The explosion combustion products are allowed to exhaust to the atmosphere through an air valve.

Deribas U.S. Pat. No. 4,085,883 and Minin U.S. Pat. No. 4,081,982 disclose spherical containment vessels with a bottom opening through which a work piece incorporating an explosive is introduced through an elevator means, and continuous feed wire electrodes are used to make contact with an electrically initiated detonator when the work piece is in place. The latter patent also discloses means for introducing an internal liquid spray after the explosion for the purpose of neutralizing toxic by-products of the explosion.

Smirnov, et al. U.S. Pat. No. 4,079,612 discloses a roughly hemispherical containment vessel mounted on a concrete foundation with a shock-absorbing work table for supporting the work piece and explosive material, which are detonated through electric ignition wires leading through openings in the containment vessel to the outside.

A different approach is disclosed by Paton, et al. U.S. Pat. No. 3,910,084 in which multiple closed-end pipes are disposed radially around a central column in which the explosion is initiated, with the shock waves dampened by internal baffles within the tubes. Access is gained to the chamber through a removable top cover plate.

Klein, et al. U.S. Pat. No. 3,611,766 discloses a vertical explosion chamber incorporating a cushioned work table for supporting the work piece and explosive charge, and an internal shock-mounted mechanical dampening means consisting of a steel grate for absorbing the explosive pressure waves. Klein U.S. Pat. No. 3,464,249 discloses a similar containment vessel, in this case spherical, with a bottom covering of loose granular material such as sand which supports the work piece and explosive charge. The explosion products are discharged through a vertical pipe containing a noise silencer, and the entire assembly is supported by shock absorbing means in a reinforced brick or concrete pit for the further suppression of shock and noise.

All of the above prior art devices represent improvements over the methods first used for explosion hardening of manganese steel rail components which involved placing the explosive-covered work piece in an open field, or at the bottom of an open pit such an abandoned gravel pit, and setting off the explosion in the open air with resultant noise, dust, disturbance and contamination of the environment. In addition, the uncontrolled use of explosives required great amounts of space, posed substantial danger to equipment and personnel, and had the undesirable effect of demolishing the ignition leads, the work piece support surface, and everything else within the immediate vicinity of the explosion.

It is therefore the principal object of the present invention to provide an improved method and apparatus for containing, controlling and suppressing the effects of explosive detonations used for industrial purposes. The purpose of the invention is to provide a containment device which can contain and suppress each explosion so that it poses no hazard to surrounding plant and equipment, or to the environment.

A further object is to provide such a method and apparatus which permits rapid and convenient charging and removal of work pieces, thereby achieving much higher rates of production than have been possible using prior art devices and techniques. A related object is to provide an explosive containment vessel which can be constructed inexpensively of common materials using conventional welding techniques but which is sturdy enough to withstand months and years of continuous use without deterioration. A related object is to provide such a device in which inexpensive consumable materials, such as silica sand and pea gravel, are used as damping and shock absorbing agents, rather than complex and expensive internal springs, metal grates, and the like.

Another object is to provide an explosion containment chamber which is readily opened from one end to allow charging and removal of work pieces by conventional means such as a forklift truck, and to allow easy entrance and exit by maintenance personnel. A further object is to provide quick and efficient removal of gaseous explosion by-products after detonation so that maintenance personnel can immediately enter the chamber to remove the treated work piece and put another in place for the next operation.

Still another object is to provide an internal ignition system in which the electrical leads for the detonation initiation system are protected from blast effect and are reusable for a great number of explosion cycles, rather than being destroyed and having to be replaced after each cycle.

Another principal object of the invention is to provide a means of quickly removing and treating the gaseous explosion by-products by passing them through a scrubber system, so that operating personnel can re-enter the chamber immediately while the scrubber continues to process the products of the previous explosion as a new work piece and explosive charge are being readied. Also, it is an object of the scrubber system to further dampen and suppress shock and noise from each detonation by virtue of the extended travel path of the explosion products as they pass through the scrubber.

A particularly important object of the invention is to provide a simple and inexpensive means for absorbing the unused energy of the explosion, for instantaneously reducing temperatures and pressures within the chamber, while at the same time suppressing dust and particulate matter in the explosion by-products.

Still another principal object of the invention is to provide a method and apparatus for controllably destroying munitions containing multiple explosive units (cluster bomb weapons) by detonation.

SUMMARY OF THE INVENTION

The improved explosion chamber of the invention comprises a double-walled steel explosion chamber anchored to a concrete foundation, and having a double-walled access door for charging new work pieces, and a double-walled vent door for discharging the products of the explosion. The double walls of the chamber, access door and vent door are filled with granular shock damping material such as silica sand, and the floor of the chamber is covered with granular shock-damping bed such as pea gravel.

Along the outside of the chamber are steel manifolds from which a linear array of vent pipes penetrates the double walls of the chamber, with each pipe terminating in a hardened steel orifice through which the explosion combustion products pass.

Within the chamber, pre-measured containers of an energy-absorbing medium, preferably comprising plastic polymer film bags containing water are suspended from steel wires over the explosive material, and at each end of the chamber. Electrical igniter lead wires enter the chamber through a steel hood having a downward-facing access opening positioned in a protected location below the surface of the granular bed, but accessible by an operator for quickly attaching an electrical blasting cap.

The access and vent door are interlocked with the electrical igniter to block ignition unless both doors are positively shut. When the doors are opened after a detonation, a vent fan is positioned to exhaust explosion combustion products from the chamber and to draw fresh air in through the access door. The manifolds and vent door discharge into a scrubber for further cooling and environmental treatment of the gaseous combustion products.

The method of operation of the invention comprises the steps of placing an explosive work piece through the access door and onto the granular bed, suspending plastic bags containing an amount of water approximating the weight of explosive, attaching an electrical blasting cap to the igniter lead wires, closing the access and vent door, electrically detonating the explosive, immediately opening both access and vent door, and using fan means for exhausting the combustion products of the detonation from the chamber in preparation for inserting the next explosive work piece.

The gaseous combustion products exiting the manifolds and vent discharge are then cooled and environmentally treated in a scrubber before being released to the atmosphere.

When used to dispose of munitions, a fragmentation containment unit ("FCU") is used. The FCU is a heavy-walled bucket-shaped casting, preferably of manganese steel, having at its bottom a bed of silica sand onto which the munition is placed, supported by one or more layers of gypsum board. Over the FCU, suspended from the roof of the chamber, is a conventional steel cable or chain blast mat. The munition is detonated by a starter charge, and the FCU and blast mat absorb the impact of any fragments or shrapnel, and the chamber then serves to absorb the remaining energy of the blast and to dissipate the explosion combustion products in the manner described above.

DETAILED DESCRIPTION OF THE INVENTION

Figure 1:
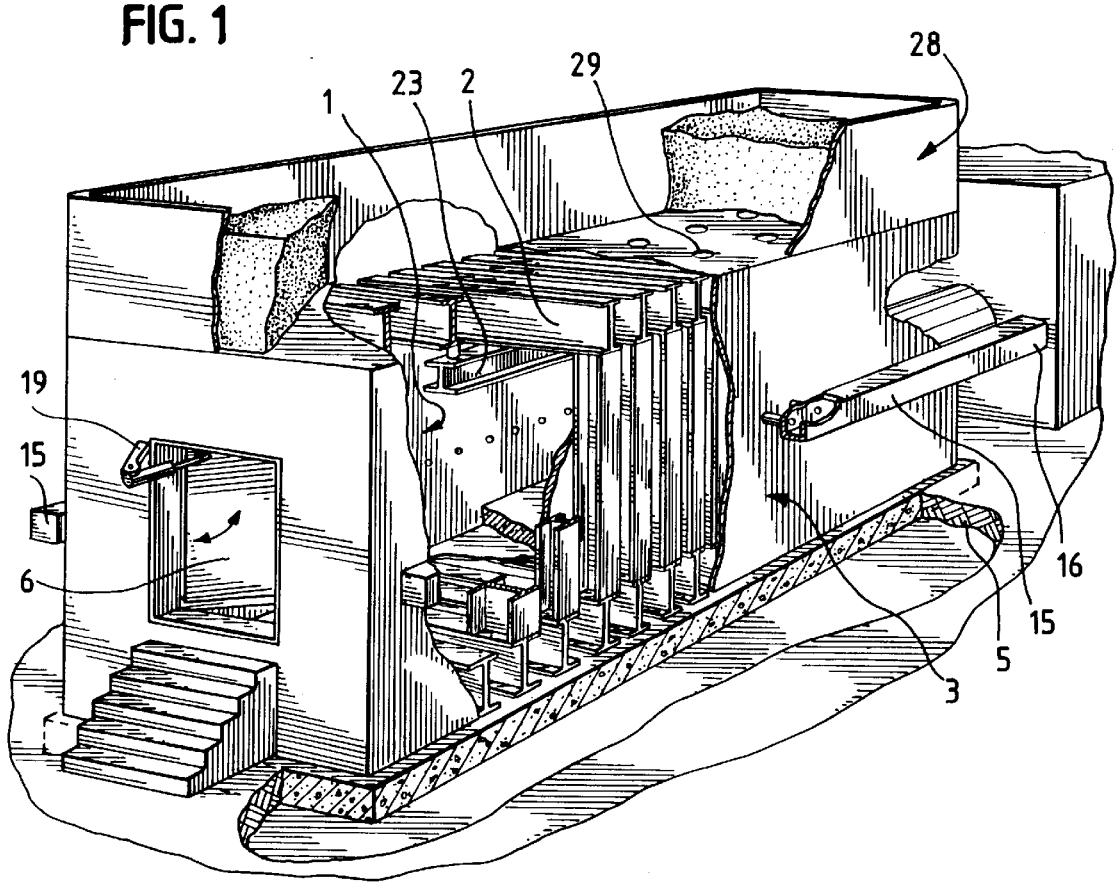
FIG. 1 is a cut-away perspective view of a first preferred embodiment of the improved explosion containment chamber of the present invention.
Figure 2:
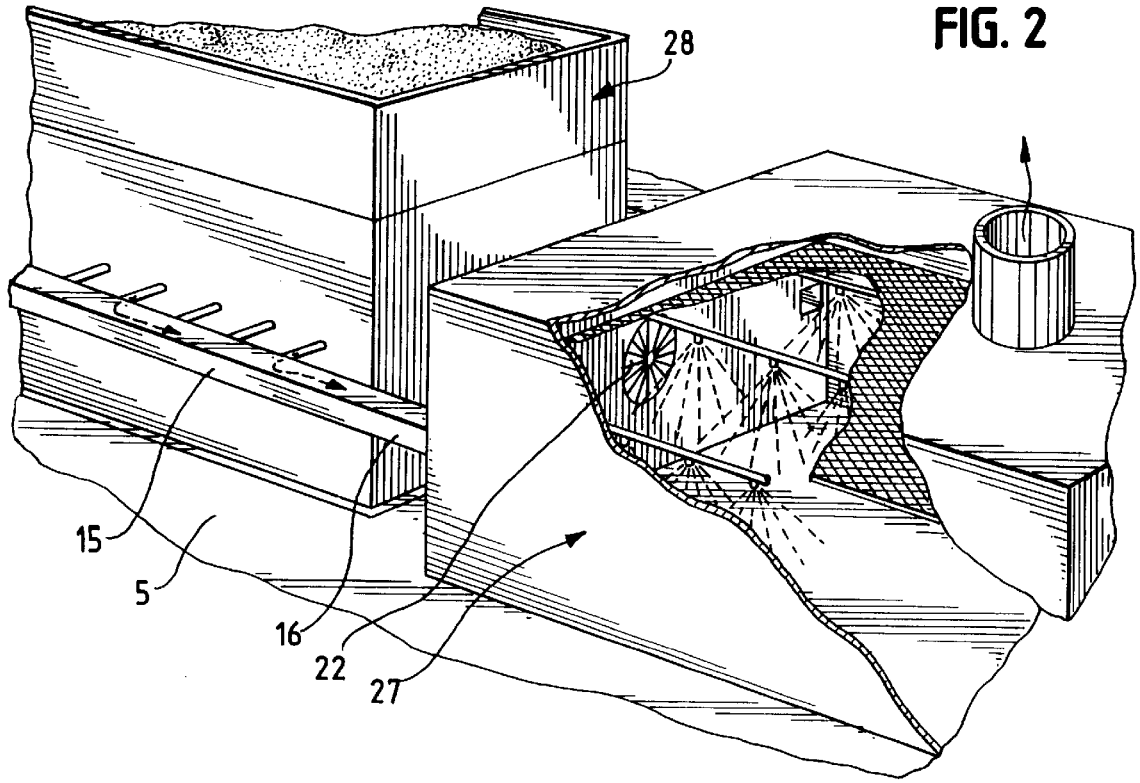
FIG. 2 is a cut-away partial perspective view of the opposite end of the chamber of FIG. 1, including a scrubber for cleaning the gaseous explosion products before venting them to the atmosphere.
Figure 3:
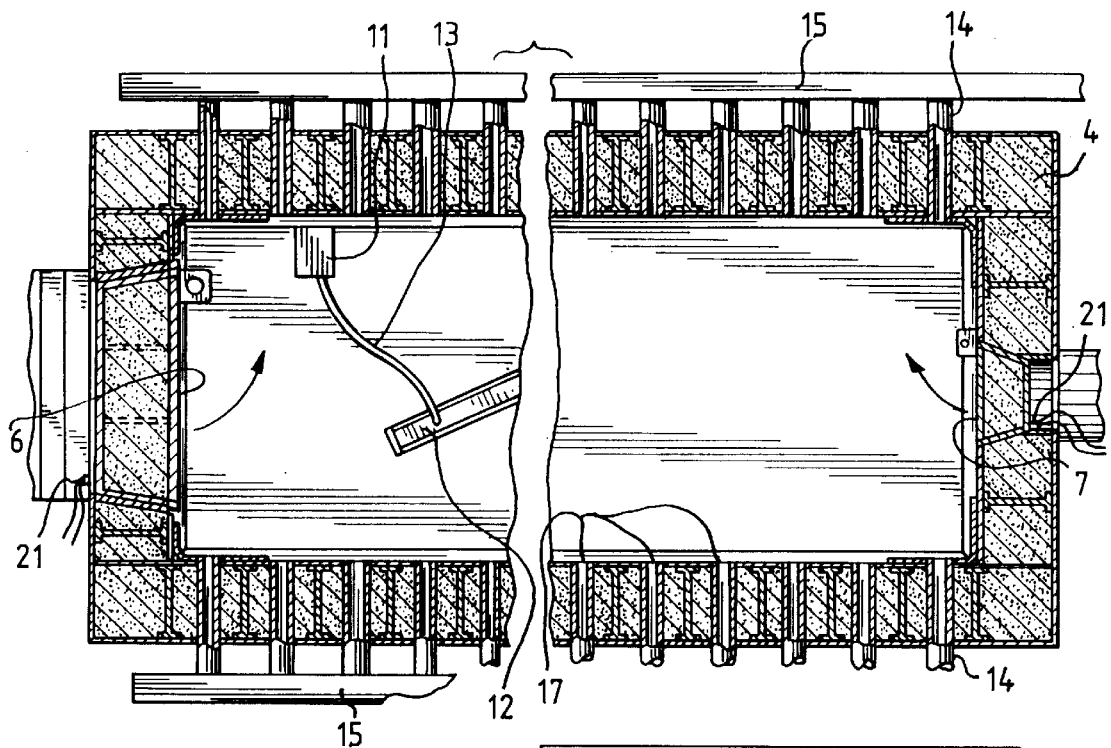
FIG. 3 is a partial sectional plan view of the explosion chamber of the preceding figures.
Figure 5:
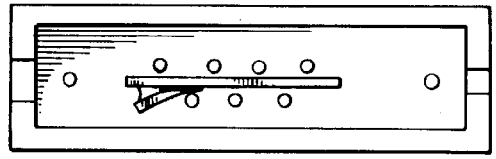
FIG. 5 is a reduced-scale sectional plan view of the full length of the explosion chamber of the preceding figures showing a railroad track work piece in place for explosion hardening treatment.
Figure 4:
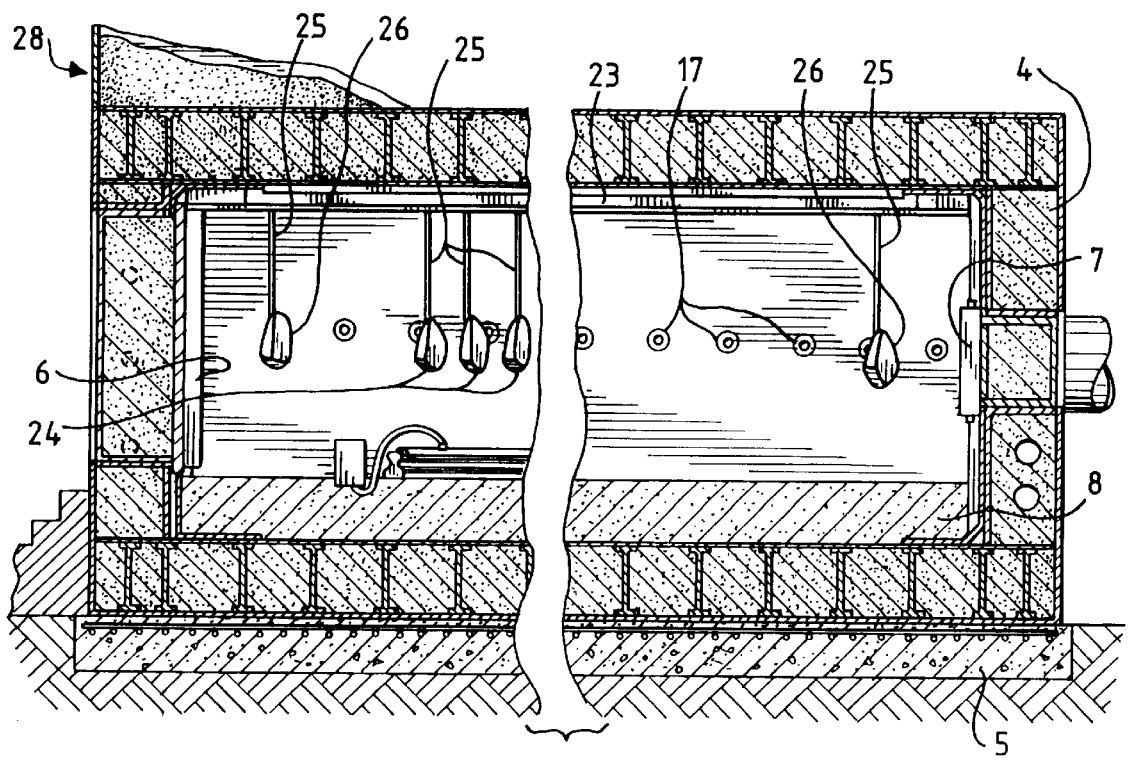
FIG. 4 is a partial sectional side elevation of the explosion chamber of the preceding figures.
Figure 6:
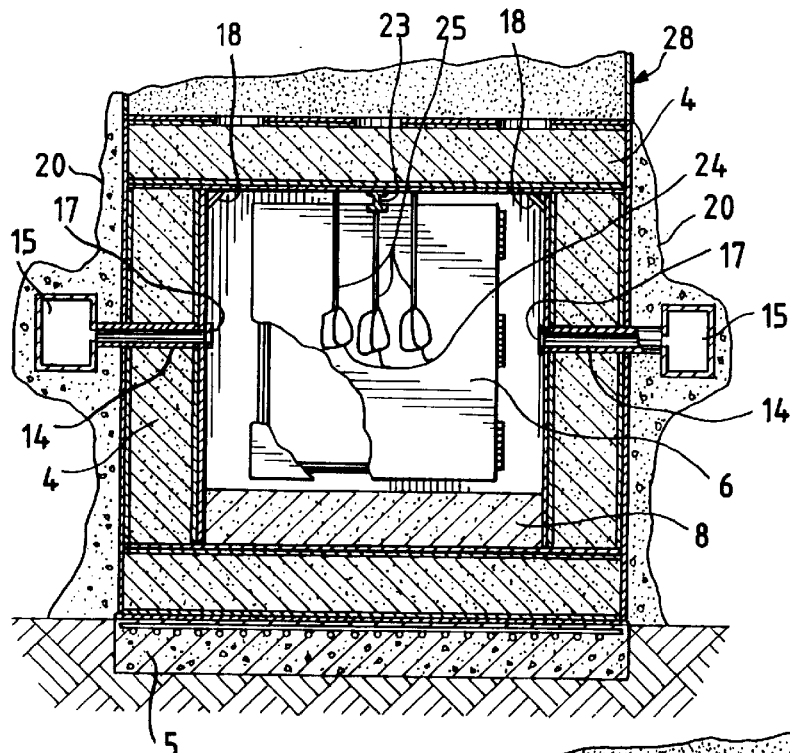
FIG. 6 is a sectional end elevation showing the access door 6 end of the explosion chamber of the preceding figures.
Figure 7:
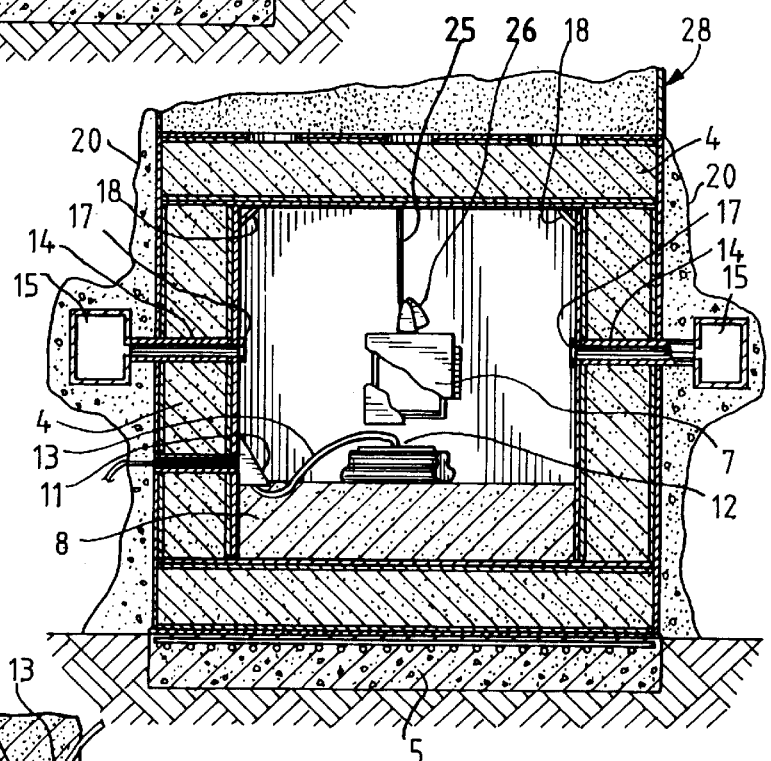
FIG. 7 is a sectional end elevation showing the vent door 7 end of the explosion chamber of the preceding figures, with a piece of rail trackwork in place for treatment.
Figure 8:
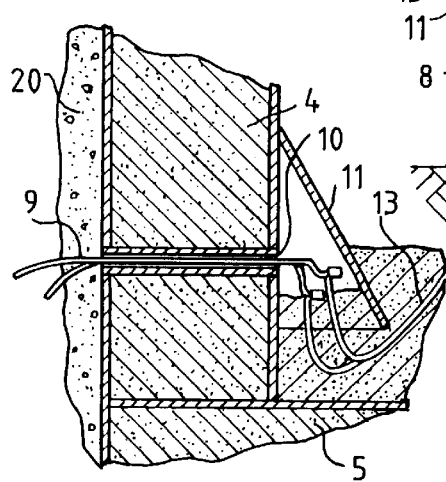
FIG. 8 is an enlarged partial sectional end elevation of the ignition wire entry point into the explosion chamber of the preceding figures.

Turning to the drawings, FIG. 1 is a sectional perspective of the improved explosion chamber of the present invention.

The chamber comprises an inner casing 1 having a ceiling, floor, side walls and ends, being fabricated of sheet steel using conventional welding techniques. Surrounding the inner casing 1 are a plurality of spaced circumstantial flanges or ribs 2 over which a welded sheet steel outer casing 3 is constructed so that the ribs 2 cause the outer casing 3 to be spaced from the inner casing 1 and leaving a gap which is then filled with a granular shock-damping material. In the first preferred embodiment as shown in FIGS. 1–8, which embodiment is particularly adapted for the explosion surface hardening treatment of railroad trackwork, the inner and outer metal casings are constructed of three-quarter inch thick sheet steel separated by circumferential steel I-beam ribs 2 spaced every two feet. All seams are continuous-welded. According to the invention, the space between the inner and outer casing 3 is filled with a firm, granular shock-absorbing material, preferably silica sand.

The explosion chamber is anchored by bolts or other suitable means (not shown) to a reinforced concrete foundation 5. In the preferred embodiment shown, the inside dimensions of the explosion chamber are: eight feet high, six feet wide, and fifty feet long. The reinforced concrete foundation 5 is preferably at least four feet thick.

As one of the major advantages of the invention, the internal dimensions of the chamber allow an operator to enter, stand up and work easily, and its length, in the first preferred embodiment, permits long pre-welded sections of railroad trackwork to be inserted and explosion-hardened, which was not possible in prior art explosion chambers.

The chamber is provided with two doors, an access door 6, and a vent door 7. Both doors are constructed of double-walled welded steel similar to the chamber walls, and each is hinged to open in an inward direction. The door jambs are constructed so that each door fits in a sealing relationship so that increased pressure within the chamber causes the door to seal tighter against its frame. The volume within the double-walled doors is also filled with shock-damping material, preferably silica sand.

The floor of the chamber is preferably covered with a bed 8 of granular shock-damping material, preferably pea gravel, to a uniform depth of about one foot, thereby forming a support surface for the work piece and explosive to be detonated.

To initiate ignition of the explosive, electrical wire firing leads 9 penetrate the chamber through a pressure-sealed opening 10 and emerge through a welded sheet steel shield box or hood 11 having an downward-facing opening positioned below the surface of the granular shock-damping material. To prepare the work piece and charge for detonation, a suitable electric detonator cap 12 is inserted into the explosive charge and the ends of its wire leads 13 are routed over to the firing wire hood 11. The pea gravel is scooped away to expose the ends of the firing wire leads 9, the leads are twisted together to complete the firing circuit, and then the pea gravel is swept back over the detonator cap leads 13 to again surround and enclose the open end of the hood 11. While the detonator cap leads 13 are substantially disintegrated by the explosion, the firing wire leads 9 remain protected under the hood 11 and may be re-used repeatedly.

As a principal feature of the invention, shock suppression means are provided for the chamber in the form of a plurality of vent pipes disposed along the centerline of one or more of the interior side walls of the chamber, with each vent pipe communicating through the chamber double wall into an elongated steel manifold 15 means extending alongside the chamber on each side and terminating in a discharge outlet 16. In the first preferred embodiment each manifold 15 is ten inches square and is fabricated by continuous-seam welding from one-half 2 inch steel plate. The ribs 2 consist of eighteen-inch I-beam sections spaced at two foot intervals. The vent pipes 14 are of two inch diameter steel tubing, and like the ribs 2 are spaced at two foot intervals. Where it connects to the inner wall of the chamber, each vent pipe is fitted with a hardened steel orifice 17 three-quarters of an inch in diameter. In the first preferred embodiment, the fifty-foot chamber has twenty-four vent pipes 14 and orifice 17 per side, for a total of forty-eight vent pipes 14 and orifice 17 in all.

Within the chamber, square corners are avoided because of the tendency of explosives to exert unusually high pressures at such critical points. Therefore, a fillet piece 18 is welded into each corner to break the 90° square corner into two 45°, which has the effect of rounding the corner and eliminating stress-raising corners or pockets which would otherwise impose undesirable destructive forces on the corner welds.

In the first preferred embodiment of the invention, additional sound suppression is obtained by coating the exterior surfaces of the outer chamber and manifold 15 with a polyurethane rigid foam coating 20 of known composition to a depth of at least four inches. The entire foam-covered structure is further enclosed in an enclosure such as a sturdy wooden shed (not shown) having screened ventilating slots to permit free circulation of air.

To open and close the access and vent door 7, double-acting hydraulic cylinders 19 are provided. As a further feature of the invention, important safety objectives are realized by providing each door with sensor means 21 as part of an electrical interlock (not shown) between the access door 6, vent door 7 and ignition means, whereby the access door 6 must both be in a closed and sealed position before the ignition means can be energized. In this way it is impossible to inadvertently detonate an explosive charge prematurely before the doors are fully closed, the result of which would be substantial destruction and damage to equipment such as the vent fan 22, not to mention the risk of bodily injury to operating personnel in the vicinity of the access door 6.

In the first preferred embodiment the chamber ceiling is fitted with a welded I-beam for use as a trolley to insert and remove particularly long lengths of steel trackwork or other work pieces of a similar shape.

Another principal feature of the invention is the provision for each explosion of liquid-filled energy absorption modules disposed roughly along the interior centerline of the chamber. These devices serve to cool the gaseous explosion products, and to suppress dust and debris in the chamber after each explosion.

In both of the preferred embodiments, the energy absorption devices are simple self-sealing polyethylene bags filled with water and hung on hanger wires 25 approximately along the center line of the chamber above and around the work piece and explosive charge. It has been discovered that commercially available "Zip-Lock" brand sandwich bags, six by eight inches in dimension and 0.002 inches (two mils) thick are satisfactory for this purpose. While water is preferable, any suitable energy-absorbing vaporizable material can also be used.

According to the invention, the volume of water placed in the chamber for each explosion is selected to be approximately equal in weight to the amount of explosive to be detonated. This volume of water is distributed among several bags which are then hung in a staggered array approximately along the center line of the chamber in the vicinity of the explosive. Preferably, the water bags 24 are hung on the hooked ends of nine-gauge steel rods welded to the ceiling of the chamber.

By using the water-filled energy absorption means, it has been found that the instantaneous theoretical pressure of the explosion is reduced by more than half, and the introduction of moisture into the chamber at the moment of detonation and thereafter has a beneficial effect of suppressing dust and cooling the explosion products instantly. In contrast to explosions without the use of the water-filled bags, the perceived impact and noise of the explosion is substantially reduced, and operating personnel are enabled to enter the chamber immediately after each detonation to remove one work piece and replace it with the next.

It has also been found in practice that the beneficial effects of the water bags 24 are enhanced if an additional water bag 26 is placed at each end of the chamber, away from the work piece, approximately four feet from the access door 6, and twelve feet from the vent door 7, although other spacings are satisfactory also.

In practice, using the water bags 24 in the manner of the invention results in the complete vaporization of both the water and the polyethylene bags, serving to absorb and suppress the undesired shock of the explosion, while leaving behind virtually no debris or residue. After each explosion, the access door 6 can be opened immediately, and all that can be seen are wisps of water vapor which are swept out the vent door 7 in the manner described further herein.

According to another important feature of the invention, all gaseous explosion by-products are quickly exhausted from the chamber in a controlled manner. After each explosion, the vent door 7 and access door 6 are simultaneously opened, the vent fan 22 is energized, and the gaseous explosion products from the chamber are drawn through the vent door 7 opening while the atmosphere in the chamber is replaced with fresh air drawn through the open access door 6. In practice, using the method and apparatus described, it has been found that the access and vent door 7 may be immediately opened after each explosion, thereby permitting operating personnel to enter the chamber immediately after each explosion to remove the treated work piece and replace it with the next.

Another major feature of the present invention is that all gaseous explosion products are controllably discharged and directed into a suitable environmental treatment means such as a scrubber 27. In the illustrated embodiment, a water-spray scrubber 27 of conventional construction is used to receive the discharge from both side-mounted manifold 15, and from the vent fan 22 as well, so that no gaseous explosion products escape to the atmosphere untreated. In addition, the tortuous path offered by the scrubber 27 creates a further level of advantageous shock and noise suppression.

To permit the refilling of gaps in the chamber walls caused by settling of the shock damping silica sand, a bin or hopper 28 is provided above the chamber with spaced openings 29 through which sand may move to replace lost volume as the sand in the walls settles or compacts with each detonation. It has been found that despite such compaction, the use of silica sand (as opposed to masonry sand) does not result in any diminishing of the shock-damping effect.

Despite the immense destructive forces of each explosive detonation, the chamber of the present invention, with its vent pipes 14 and energy absorbing liquid modules, has been found in practice to diminish the surplus destructive energy of each explosion to a point where the trolley beam 23 is virtually unaffected. Similarly, the depending wires for hanging the energy absorption water bags 24 are virtually unaffected after each blast. This allows the chamber to be used continuously, with a productive output of as many as 10 or 12 explosions per hour, which is an order of magnitude greater than permitted by any of the explosion chambers of the prior art, or by conventional open-pit explosive techniques.

In practice, with the preferred embodiment described, the method and apparatus of the present invention has been successfully utilized to safely detonate explosive charges in a wide range of sizes, ranging from two to fifteen pounds of C2 plastic explosive (also known as PETN), with minimal amounts of shock, noise and adverse effect on the environment. Surprisingly, it has been found that business office operations in an adjoining office building only two hundred feet away from the explosion chamber can be conducted in a completely normal manner, with the explosions being indistinguishable from the ordinary background noise of the office environment.

Figure 9:
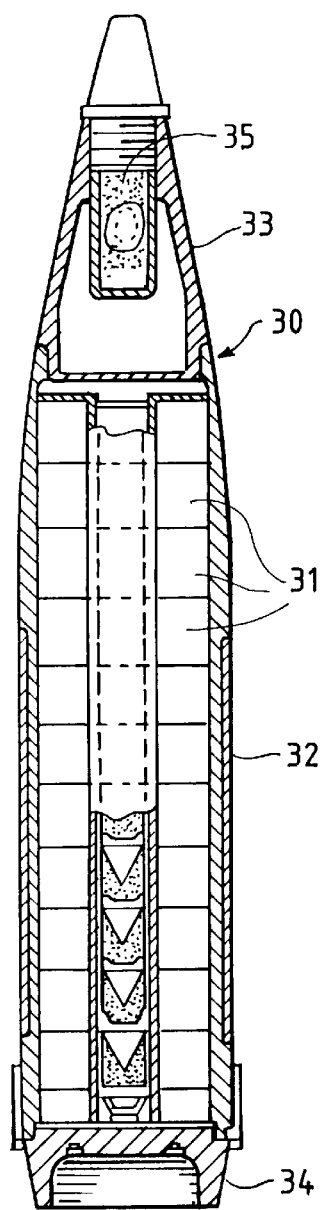
FIG. 9 is a sectional side elevation of a typical multiple-weapon or "cluster bomb" artillery munition, such as the United States Army 155 mm. M483 projectile containing 88 individual shaped-charge anti-personnel grenades, which is typical of the munitions which may be safely disposed of by the present invention.
Figure 10:
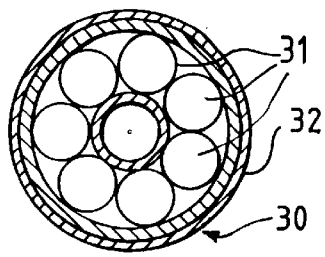
FIG. 10 is a sectional end view of the munition of FIG. 10, showing the individual grenades disposed in eight columns of ten units.
Figure 11:
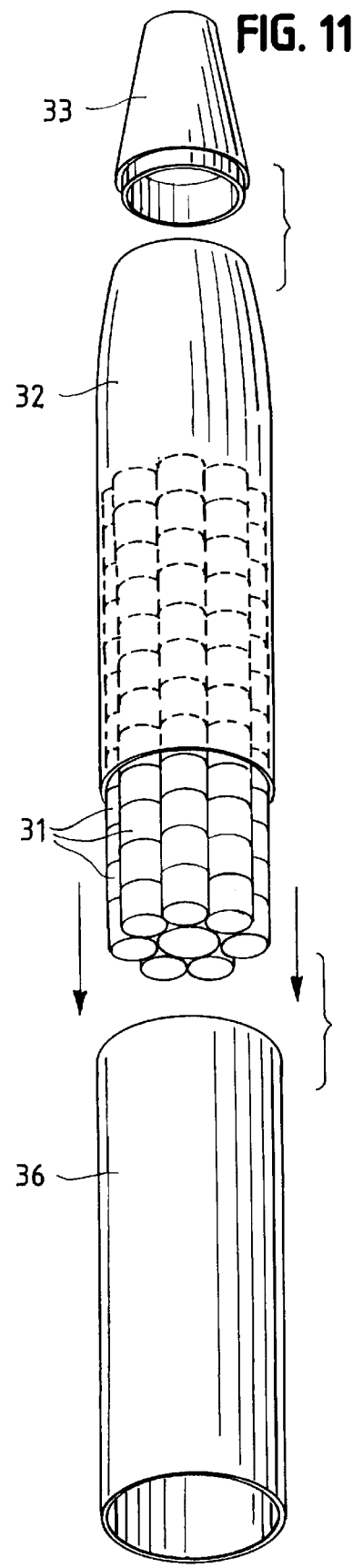
FIG. 11 is a perspective illustration of how the grenades within the munition of FIG. 9 are, according to the invention, expelled as a group into a plastic carrier tube, prior to being loaded into the FCU.
Figure 12:
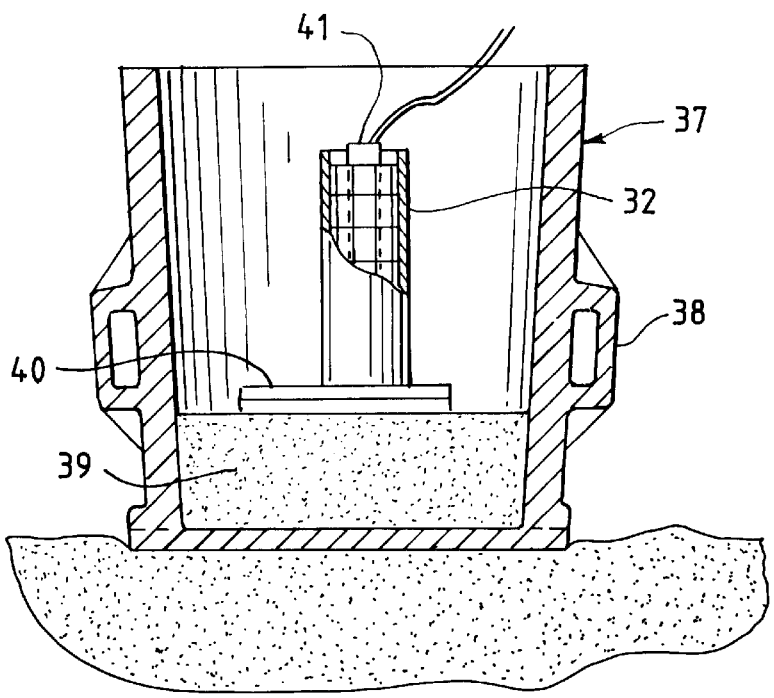
FIG. 12 is a side elevation of a fragmentation containment unit or FCU adapted for use with the explosion chamber of the preceding figures, containing the explosive contents of a cluster munition encased within the carrier tube of the preceding figure.
Figure 13:
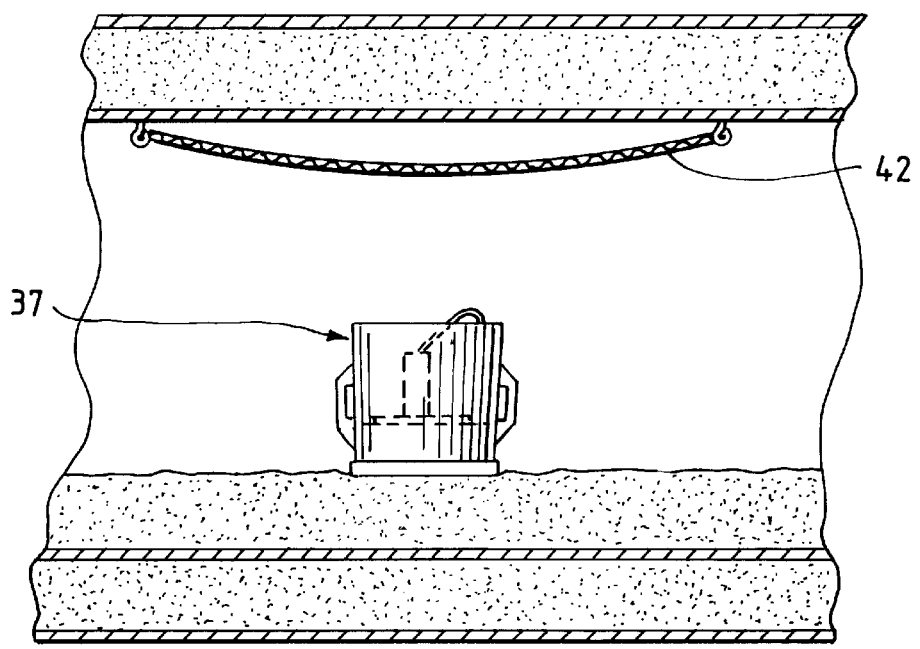
FIG. 13 is a partial sectional side elevation of a second preferred embodiment of the explosion chamber adapted for munitions disposal, showing the FCU containment unit of FIG. 9 positioned within the chamber and ready for the destruction of the contents of a munition positioned within the FCU.

A second embodiment of the invention, shown in FIGS. 11, 12 and 13, is particularly adapted for the destruction of surplus or defective munitions, particularly fragmentation munitions. FIGS. 9 and 10 illustrate one such munition 30, the United States Army M483 155 mm. "cluster bomb" artillery shell, each of which contains a close-packed array of 88 individual miniature shaped-charge grenades or bomblets 31 arranged in ten layers of eight grenades each, all contained in a cylindrical shell adapted to be fired from a 155 mm. howitzer. The munition comprises a cylindrical metal body 32 closed at its forward end by a threaded cone or ogive 33 and at its base by a base plug 34. At the tip of the ogive 33 is a fuse and expulsion charge 35. When the munition is fired and approaches its target, the fuse ignites the expulsion charge 33, driving the array of grenades backward, causing the base 34 to separate from the body 32 and the individual grenades to disperse in the air. Once dispersed, each of the individual grenades is armed by a spinning ribbon fuse (not shown) and detonates on contact with any hard surface. The grenades each have a frangible metal shell which breaks apart into shrapnel fragments on detonation, and also a shaped-charge component designed to pierce armor.

To deactivate and dispose of such munitions, conventional techniques of hand disassembly and removal of explosive components are dangerously impractical because of the large number of small individual grenades contained in each cluster-bomb munition. Should the munition be suspected of being defective or unstable, the problems are multiplied even further.

In accordance with the second embodiment of the invention, a munition 30 intended for disposal is first stripped of its ogive 33 and base plug 34, thereby exposing and allowing access to the stacked array of individual grenades 31 from both ends of the shell. Then, a cylindrical carrier tube 36 of any suitable light organic plastic material such as polyvinyl chloride (PVC) is positioned in line with the open base end of the shell body 32. The entire array of grenades is then simply pushed as a single unit out of the shell body 32 and into the carrier tube 36 so that none of the grenades need be individually handled by the operator. This manipulation, because it is relatively simple, is also adapted to being performed by remote control through robotic manipulation means (not shown).

When the array of grenades 31 has been transferred from the shell body 32 into the carrier tube 36, the carrier tube is placed into the open-topped cylindrical container 37 referred to herein as the Fragmentation Containment Unit, or "FCU". The FCU 37 acts as a primary containment chamber for the detonation of the munition, serving to partially suppress and contain the explosion and to absorb the initial high-velocity impact of fragmentation shards and debris from the explosion. The gaseous explosion products and fragmentation debris not contained by the FCU are deflected and escape upwards into the containment chamber, which is constructed in the manner shown in FIGS. 1 through 8 and described in the preceding specification.

Preferably, the main explosion chamber intended for use with an FCU for the destruction of munitions has interior dimensions in which the side and end walls are of equal length, so that in plan view it is substantially square. It is also preferably constructed with greater interior height as well, all for the purpose of providing the greatest interior volume consistent with practical and reasonable construction techniques. In this embodiment of the invention intended primarily for munitions disposal, the chamber preferably is constructed with internal dimensions of sixteen feet on each side and a height of fourteen feet.

In the preferred embodiment shown in FIGS. 12 and 13, the interior diameter of the FCU at its mouth (upper end) is 42 inches, with a wall thickness of 3.5 inches, and a height of 48 inches. At its base, the FCU interior diameter tapers of 36 inches. The FCU 37 is preferably cast of manganese alloy steel, to give it impact-hardening characteristics and to make it more resistant to the impact of shrapnel fragments. On each side of the FCU are integral cast handle lugs 38 with openings adapted to receive the prongs of a fork-lift device (not shown), so that the FCU may be charged with a munition outside of the chamber, and then carried by forklift into the chamber and placed in position for detonation.

At the bottom of the FCU there is preferably placed a granular layer 39 of about 12 inches of energy-absorbing material such as silica sand. According to another aspect of the invention, on top of the sand layer 39 is placed a support platform 40 to keep the for the carrier tube 32 upright and centrally positioned within the FCU. The support platform is preferably made of one or more layers of gypsum board (hydrated calcium sulfate sheets with a paper covering). This inexpensive, readily available material is disintegrated entirely by the ensuing detonation with no detectable residue and provides a strong and stable flat surface on which to position for the carrier tube 32 containing the array of bomblets 31 after removal from the munition.

Alternatively, a granular material may be used which can be mounded by hand into base for supporting an irregular-shaped munition (not shown). A hydrated granular mineral material such as commercially available cat litter has been found quite suitable for this purpose, and, like gypsum board, it leaves no residue after detonation.

Within the chamber, an interlocked steel blast mat 43 of woven steel cable or linked chain is suspended from the ceiling of the chamber directly overhead the FCU 37. The blast mat 43 serves to absorb the impact of any shrapnel fragments or debris not contained within the FCU.

As with the first preferred embodiment of the invention, liquid energy absorption modules are dispersed within the larger chamber in close proximity to the FCU to absorb and disperse the energy of the detonation of the munition. As before, these are preferably vaporizable containers comprising plastic film bags (not shown) filled with water, substantially evenly distributed in the space around and above the FCU by wire hangers in the manner previously described.

The mass of water to be used in the energy absorption modules has been found to be dependent upon the type of explosive to be detonated and its mass. Because the energy liberated per unit of explosive varies according to the type of explosive involved, for optimum blast suppression the mass ratio of water to explosive must also be varied. The following ratios have been determined to be substantially optimal for use with the types of explosives indicated:

| Explosive | Btu/lb | Water/Explosive Ratio |
| --- | --- | --- |
| HMX | 3,402 | 2.50 |
| RDX | 2,970 | 2.20 |
| PETN | 2,700 | 2.00 |
| C-2 | 1,700 | 1.25 |

Once the FCU 37 has been charged with the munition to be disposed of, either as an array of grenades contained within the carrier tube 32 or as a separate munition, the FCU is picked up by a fork-lift (not shown) by means of its handle lugs 38 and placed within the explosion chamber as shown in FIG. 12. A small starter charge 41 is attached to the munition and wired for external initiation in the manner previously described.

With the FCU in place within the chamber, and the starter charge wired for ignition, the doors of the chamber are closed, and the closure is verified. The starter charge 41 is then detonated, thereby detonating the munition. The initial blast and fragmentation are substantially, but not completely, contained by the FCU, and the remaining force of the blast is thereby deflected and diverted upwards into the chamber itself. The explosion chamber, having a much greater containment volume than the FCU, serves to suppress and evacuate the gaseous explosion products in the manner previously described, while the fragmentation shards left behind are picked up and disposed of separately. The carrier tube 32, being of light PVC plastic, is essentially vaporized, as is the gypsum board support platform 40, so that there is virtually no other debris to be removed before the next munition is loaded for detonation.

I claim:

1. An apparatus for controllably destroying munitions by detonation having a chamber, at least one sealable door, a removable open-topped fragmentation containment unit for containing a munition positioned within the chamber and ignition means for detonating an explosive charge within the fragmentation containment unit to initiate detonation of the munition, and characterized by a plurality of completely vaporizable liquid-filled energy absorption modules suspended in a spaced array within the chamber in proximity to the munition to be detonated.

2. An apparatus for controllably destroying munitions comprising:

a closed metal inner casing having a ceiling, a floor, side walls and ends, and a closed metal outer casing spaced from the inner casing, surrounding the inner casing to form a symmetrical double-wall chamber, spacer means for connecting the outer casing to the inner casing in rigid spaced relationship, with the space between the inner and outer casings being filled with granular shock-damping material, an openable access door at one end and an openable vent door at the other end, said access and vent doors each being of double-walled metal construction and having sealing means for causing said doors to seal tighter with increasing differential pressure within the chamber, additional granular shock-damping material covering the floor of said chamber to an even depth forming a support surface for an explosive to be detonated, and ignition means for detonating said explosive, and shock suppression means including a plurality of vent pipes connecting the inside wall of the chamber with an elongated metal manifold means for receiving and directing explosion products from the vent pipes, said manifold means terminating at an external discharge point, a removable open-topped fragmentation containment unit for containing a munition positioned within the chamber, said fragmentation containment unit being made of an impact-hardening steel alloy, and having a layer of granular shock-damping material at its bottom forming a base for supporting a munition to be detonated, and a plurality of liquid-filled energy absorption modules suspended in a spaced array within the chamber in proximity to the munition to be detonated.

3. The apparatus of claim 2 in which a flexible steel blast mat is suspended over the fragmentation containment unit to absorb the upward-directed energy of the exploding munition.

4. The apparatus of claim 2 in which the energy absorption modules comprise vaporizable containers filled with water.

5. The apparatus of claim 4, with the mass of water being selected to match the mass of explosive to be detonated selected from the following table according to the principal explosive component of the munition:

| Explosive | Btu/lb | Water/Explosive Ratio |
|---|---|---|
| HMX | 3,402 | 2.50 |
| RDX | 2,970 | 2.20 |
| PETN | 2,700 | 2.00 |
| C-2 | 1,700 | 1.25 |

6. The apparatus of claim 4 in which the containers are individual bags made of polyethylene sheet material, and the chamber ceiling has a plurality of depending wire supports from which the bags are hung.

7. The apparatus of claim 2 in which the fragmentation containment unit contains a layer of hydrated mineral salts atop the layer of granular shock-damping material to form a supporting base for the munition to be detonated.

8. The apparatus of claim 2 in which the fragmentation containment unit contains a layer of gypsum board atop the layer of granular shock-damping material to form a supporting base for the munition to be detonated.

9. A method for controllably destroying munitions by detonation within a removable open-topped fragmentation containment unit for containing a munition positioned within a chamber having at least one sealable door and ignition means for detonating an explosive charge within the chamber, comprising the steps of charging the fragmentation containment unit with a munition to be destroyed, placing the fragmentation containment unit and munition within the chamber, attaching ignition means to the munition explosive, suspending a plurality of completely vaporizable liquid-filled energy absorption modules in a spaced array within the chamber in proximity to the munition, closing and sealing the chamber doors, detonating the munition, opening the chamber doors, and exhausting the gaseous explosive combustion products through the door before re-loading the chamber with a new munition.

10. A method for controllably destroying munitions by detonation comprising the steps of:

first, placing a munition to be destroyed in a removable open-topped fragmentation containment unit (FCU) being made of an impact-hardening steel alloy, and having a layer of granular shock-damping material at its bottom forming a base for supporting the munition to be detonated;

second, placing said fragmentation containment unit in a chamber comprising:

a closed elongated metal inner casing having a ceiling, a floor, side walls and ends, and a closed elongated metal outer casing spaced from the inner casing, surrounding the inner casing to form an elongated axially symmetrical double-wall chamber having a central axis, spacer means for connecting the outer casing to the inner casing in rigid spaced relationship, with the space between the inner and outer casings being filled with granular shock-damping material, an openable access door at one end and an openable vent door at the other end, said access and vent doors each being of double-walled metal construction and having sealing means for causing said doors to seal tighter with increasing differential pressure within the chamber, additional granular shock-damping material covering the floor of said chamber to an even depth forming a support surface for said sub-chamber, and ignition means for detonating said munition, and shock suppression means including a plurality of vent pipes connecting the inside wall of the chamber with an elongated metal manifold means for receiving and directing explosion products from the vent pipes, said manifold means terminating at an external discharge point, third, placing a plurality of liquid-filled energy absorption modules suspended in a spaced array above and in proximity to the munition to be detonated, fourth, closing and sealing the access and vent doors, and fifth, detonating said munition.

11. The method of claim 10 including the further steps of opening said vent door and access door and evacuating the gaseous explosion combustion products of the detonation through the vent door, while allowing fresh air to fill the chamber from the access door.

12. The method of claim 10 including the further steps of directing the gaseous explosion combustion products from the manifold means and from the access door into a scrubber means for stripping said gaseous explosion combustion products of particulate matter and noxious vapors.

13. The method of claim 9 in which the energy absorption modules comprise plastic film containers filled with water.

14. The method of claim 13 in which the containers are individual bags made of polyethylene sheet material, and the chamber ceiling has a plurality of depending wire supports from which the bags are hung.

15. The method of claim 9, with the mass of water being selected to match the mass of explosive to be detonated selected from the following table according to the principal explosive component of the munition:

| Explosive | Btu/lb | Water/Explosive Ratio |
|-----------|--------|------------------------|
| HMX | 3,402 | 2.50 |
| RDX | 2,970 | 2.20 |
| PETN | 2,700 | 2.00 |
| C-2 | 1,700 | 1.25 |

16. The method of claim 9 in which a flexible steel blast mat is suspended over the fragmentation containment unit to absorb the upward-directed energy of the exploding munition.

17. The method of claim 10 in which the fragmentation containment unit contains an additional layer of hydrated mineral salts atop the layer of granular shock-damping material to form a supporting base for the munition to be detonated.

18. The method of claim 10 in which the fragmentation containment unit contains an additional layer of gypsum board atop the layer of granular shock-damping material to form a supporting base for the munition to be detonated.

19. A method for controllably destroying multiple explosive unit (cluster-bomb) munitions containing a multiplicity of individual bomblets in a clustered array within a closed cylindrical shell, comprising the steps of:

exposing the bomblets by removing both ends of the shell;

expelling the clustered array of bomblets intact through shell into a carrier tube of similar diameter;

placing the carrier tube containing the clustered array of bomblets into a an open-topped fragmentation containment unit within a chamber having at least one sealable door and attaching a starter charge and ignition means for detonating the bomblets within the chamber; and suspending a plurality of liquid-filled energy absorption modules in a spaced array within the chamber in proximity to the carrier tube, closing and sealing the chamber doors, igniting the starter charge to detonate the bomblets, opening the chamber doors, and exhausting the gaseous explosive combustion products through the door before re-loading the chamber.

20. The method of claim 19 for use with shaped-charge munitions, in which the carrier tube containing the clustered array of bomblets is oriented with the shaped charges oriented downward toward the closed bottom of the fragmentation containment unit.

* * * * *

UNITED STATES PATENT AND TRADEMARK OFFICE
CERTIFICATE OF CORRECTION

PATENT NO. : 5,884,569

DATED : March 23, 1999

INVENTOR(S) : John L. Donovan

Page 1 of 2

It is certified that error appears in the above-identified patent and that said Letters Patent is hereby corrected as shown below:

Abstract, line 5, "the of the chamber" should read --the chamber--

Column 2, line 15, "such an" should read --such as--

Column 3, line 25, "with granular" should read --with a granular--

Column 4, lines 66-67, "perspective of" should read --perspective view of--

Column 5, line 48, "an downward-facing" should read --a downward-facing--

Column 6, line 3, "one-half 2 inch" should read --one-half inch--

Column 6, line 10, "orifice" should read --orifices--

Column 6, line 11, "orifice" should read --orifices--

Column 7, line 51, "manifold" should read --manifolds--

Column 8, line 36, "33" should read --35--

Column 9, line 39, "the for the carrier" should read --the carrier--

Column 9, line 49, "into base" should read --into a base--

Column 12, line 4, claim 10, "unit (FCU)" should read -- unit--

UNITED STATES PATENT AND TRADEMARK OFFICE
CERTIFICATE OF CORRECTION

PATENT NO. : 5,884,569

DATED : March 23, 1999

INVENTOR(S) : John L. Donovan

It is certified that error appears in the above-identified patent and that said Letters Patent is hereby corrected as shown below:

Column 14, line 6, claim 19, "a an open-topped" should read --an open-topped--

Signed and Sealed this

Thirty-first Day of August, 1999

Attest:

Attesting Officer

Q. TODD DICKINSON

Acting Commissioner of Patents and Trademarks